March 17, 1959   G. A. LYON   2,878,073
WHEEL COVER
Filed June 2, 1955
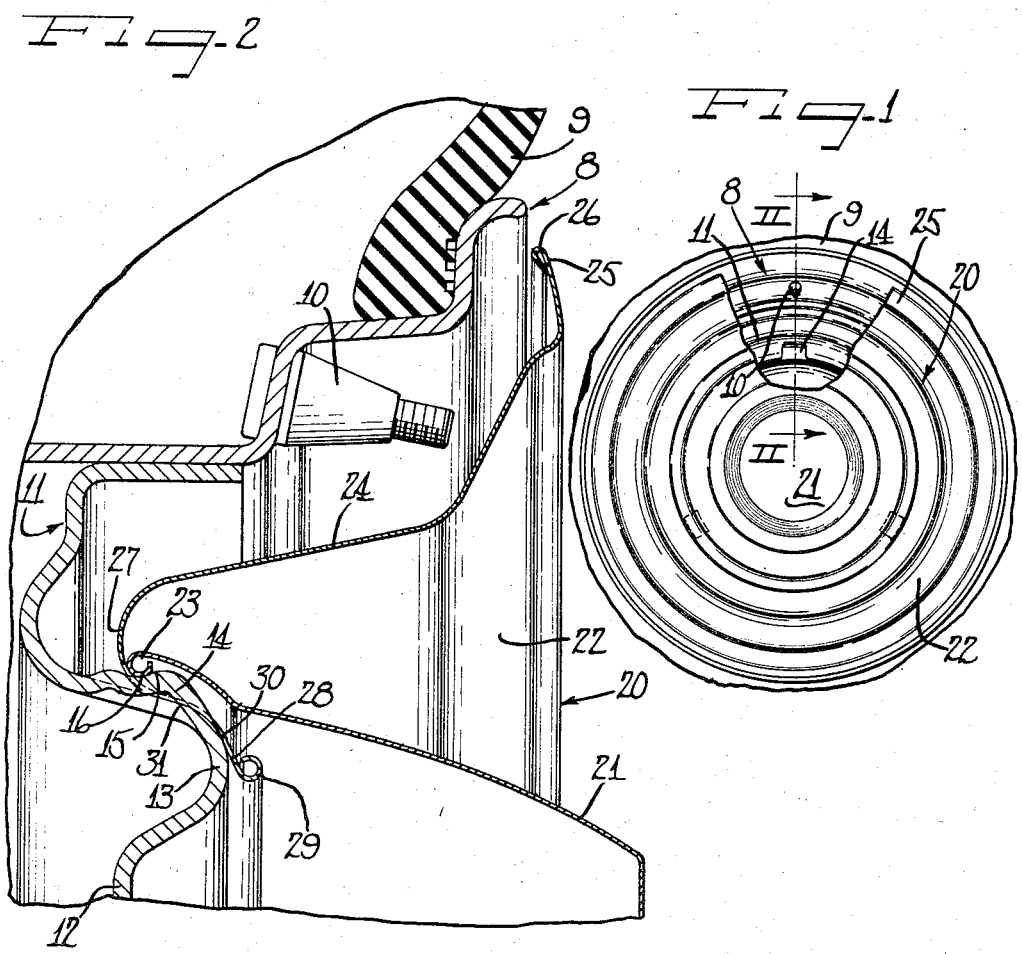
Inventor
George Albert Lyon United States Patent Office 2,878,073
Patented Mar. 17, 1959

2,878,073
WHEEL COVER

George Albert Lyon, Detroit, Mich.

Application June 2, 1955, Serial No. 512,788

3 Claims. (Cl. 301—37)

This invention relates to a wheel cover structure and more particularly to a composite ring and cap assembly and novel means for retaining the same on a wheel.

With the advent of deeper automobile wheels, the problem of providing ornamental wheel covers has been complicated by the necessity of making the cover structure of relatively deep dished cross section. These sections are of such depth that frequently they do not lend themselves to manufacture in one piece and as a consequence must be made of two separate stampings.

An object of this invention is to provide a wheel cover structure which lends itself to use with wheels of relatively great cross sectional depth and yet which may be economically and simply retained on the wheel.

Another object of this invention is to provide a multipart wheel cover assembly and novel means whereby the parts may be simply interrelated in concentric relation and detachably held on the wheel centrally of the wheel.

Still another object of the invention relates to the provision of a wheel cover structure which need only contact the wheel at the body part in its retention on a wheel, thereby eliminating the need of taking into consideration manufacturing variations in the relative axial displacements of the tire rim and body parts of the wheel.

In accordance with the general features of this invention, there is provided in a wheel cover structure including a wheel comprising a tire rim and a wheel body with a central bulge provided with spaced radially and axially outwardly inclined protuberances, a wheel cover assembly comprising a central circular cap and a radially outer annular concentric ring, with the cap and ring having cooperating overlapped margins telescopingly extending axially into the body of the wheel, the margin of the ring comprising its radially inner edge and being provided with spaced apertures for receiving and through which the wheel protuberances project, the ring margin being inclined from the protuberances radially inwardly onto the wheel body bulge so that radially spaced edges defining each aperture are disposed on opposite sides of each protuberance and whereby the innermost portion of the margin will bottom against the body bulge and limit inward axial movement of the ring on the wheel and the margin of the cap being snapped over the inclined protuberances and against the ring margin to clamp it against the wheel body bulge.

Another feature of the invention relates to the formation of the component ring and cap parts in the aforesaid wheel cover assembly so that they are only in contact with the wheel at the retaining area on the central bulge of the wheel body part.

Other objects and features of this invention may more fully appear from the following detailed description taken in connection with the accompanying drawings which illustrate a single embodiment thereof and in which—

Figure 1 is a fragmentary side view of a wheel structure embodying the features of this invention and wherein the cover assembly is partly broken away to show one of the retaining wheel protuberances therebehind; and Figure 2 is a fragmentary enlarged cross-sectional view taken on the line II—II of Figure 1 looking in the direction indicated by the arrows.

As shown on the drawings:

In the illustrated embodiment of the invention, the usual multi-flanged drop-center type of tire rim 8 carries in the customary way a pneumatic tire 9 which may, if so desired, be of the so-called tubeless type. As is customary, air may be introduced into the tire by means of the usual valve stem 10 attached in the customary way to one of the flanges of the rim 8.

Secured to the base of the rim is a sheet metal body part 11 which may be equipped with the customary central bolt-on flange 12 and which has a central axially outward bulge 13. The radially outer side of the bulge is provided with a plurality of circumferentially spaced protuberances or bumps 14 which face radially outwardly inside of the wheel body part 11. These protuberances may be of any suitable number, such, for example, as three or more, and each includes a radially and axially inclined or undercut surface 15. This surface is also provided with a groove 16 in which an edge of the hub cap, to be hereinafter described, is adapted to bottom.

Cooperable with this wheel is a sheet metal cover assembly designated generally by the reference character 20 and includes a central relatively deeply dished circular member or hub cap 21 and a radially outer relatively deeply dished annular ring 22. The ring 22 confronts and is concentric with the hub cap 21. Both of these parts of the cover assembly 20 telescope the wheel body part 11 radially outwardly of the central nose 13. The outer margin of the hub cap 21 has an inwardly turned or rolled continuous edge 23 which is adapted to be resiliently sprung over the bumps into retaining engagement in the grooves 16 of the bumps.

The ring 22 has a deeply drawn inclined surface 24 facing the hub cap 21 and which leads into an outer cover margin 25 having a reinforced pry-off edge 26. The portion 24 merges into a curved portion 27 which leads into the inner margin 28 of the ring. This portion 28 is inclined radially and axially inwardly and terminates in a turned or beaded edge 29. The portion 28 is adapted, when on the wheel bulge 13, to bottom at 30 against the bulge radially inwardly of the protuberances 14.

The ring margin 28 is provided with a plurality of slots or apertures 31 corresponding in number and size to those of the protuberances. Each aperture is of a size to receive and permit one of the bumps 14 to project therethrough so that the margin 28, in reality, straddles the bumps but can bottom against the wheel nose 13 radially inwardly of the bumps.

In the application of the cover to the wheel, the ring is first placed over the wheel, with the apertures 31 aligned with the protuberances, and is pressed onto the central wheel bulge or nose 13 until the protuberances project through the apertures 31.

Thereafter, the hub cap 21 is placed over the center of the wheel with its edge 23 overlapping the inner margin of the ring 22. Upon the application of axial pressure against the cap, its springy edge 23 is distorted so as to snap over the bumps into retaining engagement therewith in the grooves 16 of the bumps. In so doing, the springy edge 23 clampingly engages the inner margin of the ring forcing it to tightly bottom at 30 against the central wheel bulge 13 radially inwardly of the bumps.

From the foregoing, it is clear that the cover assembly is retained on the wheel solely at the bulge 13 and the cap and ring parts are otherwise out of contact with the wheel. This enables the outer edge 26 of the ring to be free for the introduction of the edge of a screwdriver thereunder when it is desired to forcibly eject the cover assembly 20 from the wheel in order to get access to the central wheel bolts (not shown).

It will be appreciated that the ring 22 is held in resilient stressed engagement with the nose or wheel bulge 13 by the clamping contact of the hub cap edge 23 against the inner margin of the ring 22.

The spacing of the ring edge 26 from the rim 8 enables air to circulate through such spacing as well as permits the cover assembly to accommodate allowable manufacturing variations in the location of the rim 8 relative to body part 11.

It will be understood that modifications and variations may be effected without departing from the scope of the novel concepts of the present invention.

I claim as my invention:

1. In a wheel cover structure including a wheel comprising a tire rim and a wheel body having a junction and with an annular axially inwardly dished area including a side wall disposed axially inwardly and generally confronting the junction with the side wall having a central bulge provided with spaced radially and axially outwardly inclined protuberances, a wheel cover assembly comprising a central circular cap member including a first generally axially extending portion and a radially outer annular concentric ring member having a second generally axially extending portion in confronting spaced relation to said first axial portion with the axially inwardly extending portion extending into the dished area on the body of the wheel, said cap and ring members having overlapped margins, said margin of the ring comprising its radially inner edge and being provided with spaced apertures for receiving and through which said wheel protuberances project, said ring margin being inclined from the protuberances radially inwardly on to the wheel body bulge so that radially spaced edges defining each aperture are disposed on opposite sides of each protuberance and whereby the innermost portion of said margin will bottom against the body bulge and limit inward axial movement of the ring on the wheel, and said margin of the cap being snapped over said inclined protuberances and against said ring margin to clamp it against said wheel body bulge, each protuberance having a radially outwardly facing groove in which the edge of the cap is received and urges the ring into bottom engagement with the wheel body.

2. In a wheel cover structure including a wheel comprising a tire rim and a wheel body having a junction and with an annular axially inwardly dished area including a side wall disposed axially inwardly and generally confronting the junction with the side wall having a central bulge provided with spaced radially and axially outwardly inclined protuberances, a wheel cover assembly comprising a central circular cap member including a first generally axially extending portion and a radially outer annular concentric ring member having a second generally axially extending portion in confronting spaced relation to said first axial portion with the axially inwardly extending portion extending into the dished area on the body of the wheel, said cap and ring members having overlapped margins, said margin of the ring comprising its radially inner edge and being provided with spaced apertures for receiving and through which said wheel protuberances project, said ring margin being inclined from the protuberances radially inwardly on to the wheel body bulge so that radially spaced edges defining each aperture are disposed on opposite sides of each protuberance and whereby the innermost portion of said margin will bottom against the body bulge and limit inward axial movement of the ring on the wheel, and said margin of the cap being snapped over said inclined protuberances and against said ring margin to clamp it against said wheel body bulge, each protuberance having a radially outwardly facing groove in which the edge of the cap is received and urges the ring into bottom engagement with the wheel body, said ring member and cap member being spaced radially outwardly and inwardly of the protuberances which protrude from the dished area of the wheel body whereby the cover assembly only contacts the wheel body at the wheel body bulge.

3. In a wheel cover structure including a wheel comprising a tire rim and a wheel body having a junction and with an annular axially inwardly dished area including a side wall disposed axially inwardly and generally confronting the junction with the side wall having a central bulge provided with spaced radially and axially outwardly inclined protuberances, a wheel cover assembly comprising a central circular cap member including a first generally axially extending portion and a radially outer annular concentric ring member having a second generally axially extending portion in confronting spaced relation to said first axial portion with the axially inwardly extending portion extending into the dished area on the body of the wheel, said cap and ring members having overlapped margins, said margin of the ring comprising its radially inner edge and being provided with spaced apertures for receiving and through which said wheel protuberances project, said ring margin being inclined from the protuberances radially inwardly on to the wheel body bulge so that radially spaced edges defining each aperture are disposed on opposite sides of each protuberance and whereby the innermost portion of said margin will bottom against the body bulge and limit inward axial movement of the ring on the wheel, and said margin of the cap being snapped over said inclined protuberances and against said ring margin to clamp it against said wheel body bulge, each protuberance having a radially outwardly facing groove in which the edge of the cap is received and urges the ring into bottom engagement with the wheel body, said cap member having an annular radially inwardly extending rib at the junction of said first axially extending portion with said cap margin to increase the flexibility of said cap margin to facilitate radially outward camming of said cap over said protuberances.

References Cited in the file of this patent

UNITED STATES PATENTS

| | | |
|---|---|---|
| 2,445,330 | Lyon | July 20, 1948 |
| 2,607,633 | Lyon | Aug. 19, 1952 |